US012247394B2

(12) United States Patent
Weiqiang et al.

(10) Patent No.: US 12,247,394 B2
(45) Date of Patent: *Mar. 11, 2025

(54) INFLATABLE PARTITION

(71) Applicant: The Boeing Company, Arlington, VA (US)

(72) Inventors: Liu Weiqiang, Beijing (CN); Zhongzhe Dong, Beijing (CN); Long Long, Beijing (CN); Daniel Wei, Beijing (CN)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,109

(22) Filed: Oct. 27, 2023

(65) Prior Publication Data

US 2024/0060296 A1 Feb. 22, 2024

Related U.S. Application Data

(63) Continuation of application No. 17/551,672, filed on Dec. 15, 2021, now Pat. No. 11,885,123.

(60) Provisional application No. 63/134,270, filed on Jan. 6, 2021.

(51) Int. Cl.
*B64D 11/00* (2006.01)
*E04B 2/74* (2006.01)

(52) U.S. Cl.
CPC ........ *E04B 2/7416* (2013.01); *B64D 11/0023* (2013.01)

(58) Field of Classification Search
CPC ..... B64D 11/0023; B64C 1/34; B60R 21/026; B60R 21/04; B60R 21/06; B60R 21/065; B60R 2021/0093; B60R 2021/0266; B60R 2021/0442; B60R 2021/23161
See application file for complete search history.

(56) References Cited

U.S. PATENT DOCUMENTS

| | | | |
|---|---|---|---|
| 2,955,606 A | 10/1960 | Walker | |
| 3,178,779 A | 4/1965 | Clark et al. | |
| 3,284,955 A | 11/1966 | Schroth | |
| 3,548,904 A | 12/1970 | Mackell | |
| 4,430,832 A | 2/1984 | Kaiser et al. | |

(Continued)

FOREIGN PATENT DOCUMENTS

| | | |
|---|---|---|
| DE | 3922579 A1 | 1/1991 |
| WO | 2010130062 A1 | 11/2010 |

*Primary Examiner* — Joshua J Michener
*Assistant Examiner* — Ryan Andrew Yankey
(74) *Attorney, Agent, or Firm* — Yee & Associates, P.C.

(57) ABSTRACT

An inflatable partition includes a flexible membrane, an inflatable frame, and a support member coupled to the inflatable frame. The inflatable frame extends along a periphery of the flexible membrane and has an inner edge adjacent to the flexible membrane and an outer edge. The inflatable frame further includes a sealing mechanism extending along at least a portion of the outer edge and the inflatable frame is inflatable between a first state and a second state. The inflatable partition includes a first structural member and a second structural member. Each of the first and second structural members is coupled to the inflatable frame and extends vertically from the upper portion to the bottom portion of the inflatable frame and the first and second structural members define an opening in the inflatable partition.

20 Claims, 7 Drawing Sheets

(56) References Cited

U.S. PATENT DOCUMENTS

| | | |
|---|---|---|
| 4,899,962 A | 2/1990 | Mueller |
| 7,178,810 B1 | 2/2007 | Kuhary |
| 10,286,993 B2 | 5/2019 | Castro et al. |
| 11,885,123 B2 * | 1/2024 | Weiqiang .............. E04B 2/7416 |
| 2012/0042578 A1 | 2/2012 | Chen |
| 2012/0131857 A1 | 5/2012 | Ross-Da Silva |
| 2014/0094103 A1 | 4/2014 | Dreyhaupt et al. |
| 2015/0101258 A1 | 4/2015 | Milo et al. |
| 2015/0166167 A1 | 6/2015 | Kies |
| 2015/0321744 A1 | 11/2015 | Vetter et al. |
| 2021/0380253 A1 | 12/2021 | Vermeulen |

\* cited by examiner

INFLATABLE PARTITION

CLAIM OF PRIORITY AND CROSS-REFERENCE TO RELATED APPLICATIONS

This application is a continuation of U.S. patent application Ser. No. 17/551,672, which was filed on Dec. 15, 2021, is now allowed, and claims the benefit of priority to U.S. Provisional Patent App. No. 63/134,270, which was filed on Jan. 6, 2021, and is now expired. Both of the foregoing patent applications are incorporated herein by reference in their respective entireties and for all purposes.

TECHNICAL FIELD

The present disclosure relates to an inflatable partition to create a temporary, portable barrier.

BACKGROUND

The seats of vehicles, such as an airplane, bus, train, or automobile, and of a venue such as a concert hall, auditorium, etc. may be spaced close together such that passengers or attendees are in close proximity. Pathogens, such as SARS-CoV-2/COVID-19, for example and without limitation, may be spread between passengers or attendees through air droplets created as the result of breathing, coughing, sneezing, etc. The spread of such pathogens is particularly prevalent if physical distancing or other measures are not possible or used.

SUMMARY

Embodiments according to the present disclosure provide a number of advantages. For example, embodiments according to the present disclosure enable a portable, inflatable, lightweight partition to easily separate areas. The inflatable partition establishes a temporary barrier to enable containment and separation of areas where a permanent divider is not possible or desired.

In one aspect of the present disclosure, an inflatable partition includes a flexible membrane and an inflatable frame extending along a periphery of the flexible membrane. The inflatable frame has an inner edge adjacent to the flexible membrane and an outer edge. The inflatable frame includes a first side, a second side opposite the first side, an upper portion connecting the first and second sides, and a bottom portion opposite the upper portion. The inflatable frame further includes a sealing mechanism extending along at least a portion of the outer edge. The inflatable frame is inflatable between a first state and a second state. The inflatable partition also includes a support member coupled to the inflatable frame and a first structural member and a second structural member. Each of the first and second structural members is coupled to the inflatable frame and extends vertically from the upper portion to the bottom portion of the inflatable frame. The first and second structural members define an opening in the inflatable partition.

In some aspects, the sealing mechanism includes a first sealing mechanism extending along the first side of the inflatable frame and a second sealing mechanism extending along the second side of the inflatable frame.

In some aspects, the sealing mechanism includes a third sealing mechanism extending along the upper portion of the inflatable frame.

In some aspects, the first sealing mechanism includes a first sealing member and a second sealing member spaced apart from the first sealing member.

In some aspects, the first and second sealing members are flexible strips extending outward from the outer edge of the inflatable frame, and each of the first and second sealing members is configured to frictionally engage with a surface such that the inflatable partition is releasably secured to the surface.

In some aspects, the first and second sealing members are silicone rubber.

In some aspects, the sealing mechanism includes a first sealing member and a second sealing member spaced apart from the first sealing member. The first and second sealing members are configured to frictionally engage with a surface when the inflatable frame is inflated such that a negative pressure condition exists between the inflatable frame and the surface.

In some aspects, the flexible membrane includes a first flexible membrane and a second flexible membrane releasably coupled together to extend across the opening.

In some aspects, the first flexible membrane has a first edge, the second flexible membrane has a second edge, and the first and second flexible membranes are magnetically coupled together along the first and second edges.

In some aspects, the flexible membrane is transparent.

In some aspects, the flexible membrane is foldable.

In some aspects, the flexible membrane includes a first flexible membrane extending from the inner edge of the first side of the inflatable frame to the first structural member, a second flexible membrane extending from the first structural member, a third flexible membrane extending from the second structural member, and a fourth flexible member extending from the inner edge of the second side of the inflatable frame to the second structural member. The second and third flexible membranes are releasably coupled together to extend across the opening.

In some aspects, the inflatable frame is inflatable between the first state comprising an uninflated state and the second state comprising an inflated state.

In some aspects, the support member is inflatable and is fluidly coupled to the inflatable frame.

In some aspects, the support member includes a first support member, a second support member, a third support member, and a fourth support member. Each of the first, second, third, and fourth support members extends perpendicular to the inflatable frame.

In some aspects, the first, second, third, and fourth support members are evenly distributed along the bottom portion of the inflatable frame.

In some aspects, the inflatable frame has a varying diameter around the periphery of the flexible membrane when the inflatable frame is inflated.

In some aspects, the inflatable partition further includes an inflation mechanism including a battery, a motor coupled to the battery, and a turbine coupled to the motor, and the inflatable frame is inflatable by the inflation mechanism.

In some aspects, the inflatable frame is inflatable by one or more of an external pump, a fan, and a compressed air cartridge.

In another aspect of the present disclosure, a vehicle includes a body having an interior surface and an inflatable partition. The inflatable partition includes a flexible membrane and an inflatable frame extending along a periphery of the flexible membrane. The inflatable frame has an inner edge adjacent to the flexible membrane and an outer edge. The inflatable frame includes a first side, a second side opposite the first side, an upper portion connecting the first and second sides, and a bottom portion opposite the upper portion. The inflatable frame further includes a sealing mechanism extending along at least a portion of the outer edge. The inflatable frame is inflatable between a first state and a second state. The inflatable partition also includes a support member coupled to the inflatable frame, a first structural member, and a second structural member. Each of the first and second structural members is coupled to the inflatable frame and extends vertically from the upper portion to the bottom portion of the inflatable frame, the first and second structural members defining an opening in the inflatable partition.

In some aspects, the sealing mechanism includes a first sealing mechanism extending along the first side of the inflatable frame and a second sealing mechanism extending along the second side of the inflatable frame.

In some aspects, the first sealing mechanism includes a first sealing member and a second sealing member spaced apart from the first sealing member.

In some aspects, the first and second sealing members are flexible strips extending outward from the outer edge of the inflatable frame. Each of the first and second sealing members is configured to frictionally engage with a surface such that the inflatable partition is releasably secured to the interior surface.

In some aspects, the sealing mechanism includes a third sealing mechanism extending along the upper portion of the inflatable frame.

In some aspects, the first and second sealing members are silicone rubber.

In some aspects, the sealing mechanism includes a first sealing member and a second sealing member spaced apart from the first sealing member. The first and second sealing members are configured to frictionally engage with the interior surface when the inflatable frame is inflated such that a negative pressure condition exists between the inflatable frame and the interior surface.

In some aspects, the flexible membrane is transparent.

In some aspects, the flexible membrane is foldable.

In some aspects, the flexible membrane includes a first flexible membrane extending from the inner edge of the first side of the inflatable frame to the first structural member, a second flexible membrane extending from the first structural member, a third flexible membrane extending from the second structural member, and a fourth flexible member extending from the inner edge of the second side of the inflatable frame to the second structural member. The second and third flexible membranes are releasably coupled together to extend across the opening.

In some aspects, the inflatable frame is inflatable between the first state comprising an uninflated state and the second state comprising an inflated state.

In some aspects, the support member is inflatable and is fluidly coupled to the inflatable frame.

In some aspects, the support member includes a first support member, a second support member, a third support member, and a fourth support member. Each of the first, second, third, and fourth support members extends perpendicular to the inflatable frame.

In some aspects, the first, second, third, and fourth support members are evenly distributed along the bottom portion of the inflatable frame.

In some aspects, the inflatable frame has a varying diameter around the periphery of the flexible membrane when the inflatable frame is inflated.

In some aspects, the inflatable partition further includes an inflation mechanism including a battery, a motor coupled to the battery, and a turbine coupled to the motor, and the inflatable frame is inflatable by the inflation mechanism.

In some aspects, the inflatable frame is inflatable by one or more of an external pump, a fan, and a compressed air cartridge.

In another aspect of the present disclosure, a method for establishing a temporary barrier includes providing an inflatable partition comprising a flexible membrane and an inflatable frame extending along a periphery of the flexible membrane. The inflatable frame has an inner edge adjacent to the flexible membrane and an outer edge. The inflatable frame includes a first side, a second side opposite the first side, an upper portion connecting the first and second sides, and a bottom portion opposite the upper portion. The inflatable frame further includes a first sealing mechanism extending along the outer edge of the first side of the inflatable frame and a second sealing mechanism extending along the outer edge of the second side of the inflatable frame. The inflatable frame is inflatable between a first state and a second state. The method further includes unfolding the inflatable partition from a folded configuration to an unfolded configuration and positioning the inflatable partition at a desired location of the temporary barrier such that the first side of the inflatable frame is adjacent to a first surface and the second side of the inflatable frame is adjacent to a second surface. The method also includes inflating the inflatable frame of the inflatable partition such that the first sealing mechanism frictionally engages with the first surface and the second sealing mechanism frictionally engages with the second surface.

In some aspects, inflating the inflatable frame of the inflatable partition includes activating an air pump coupled with the flexible membrane and fluidly coupled with the inflatable frame.

In some aspects, the method further includes creating a negative pressure condition between the first side of the inflatable frame and the first surface and between the second side of the inflatable frame and the second surface.

BRIEF DESCRIPTION OF THE DRAWINGS

The present disclosure will be described in conjunction with the following figures, wherein like numerals denote like elements.

Figure 1:
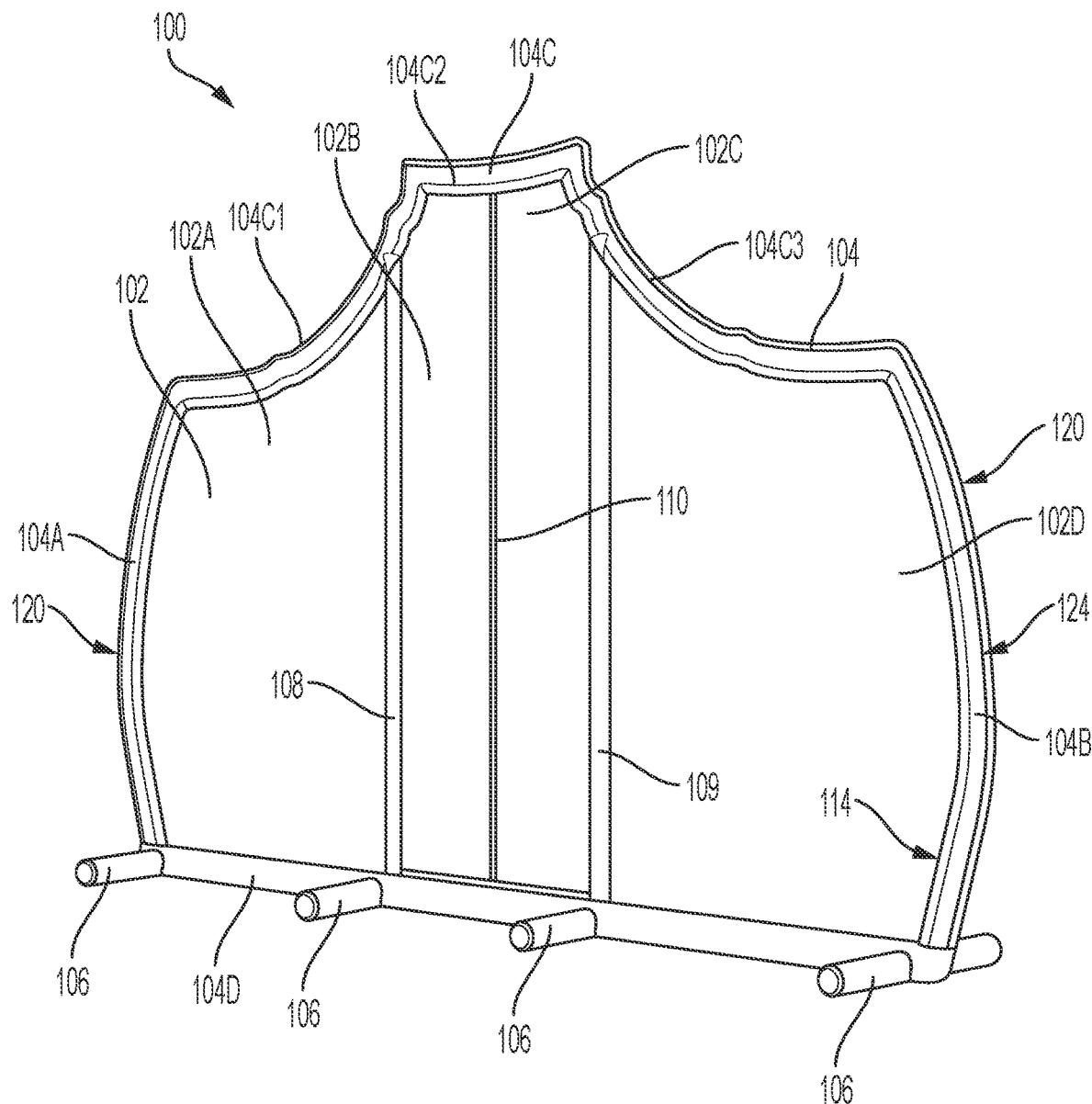
FIG. 1 is a schematic front perspective view illustration of an inflatable partition for providing a temporary barrier, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

In various embodiments, including the illustrated embodiments discussed herein, an inflatable partition includes an inflatable outer periphery with a central membrane or septum. This configuration allows the inflatable partition to be easily and quickly inflated to a desired pressure inflation and configured for position in the desired location. Additional features, such as a motor and pump, support members, a magnetic slit, among others, are included in various embodiments depending on the intended use and location of the partition. Throughout the various embodiments discussed herein, like reference numbers refer to like components.

Figure 2:
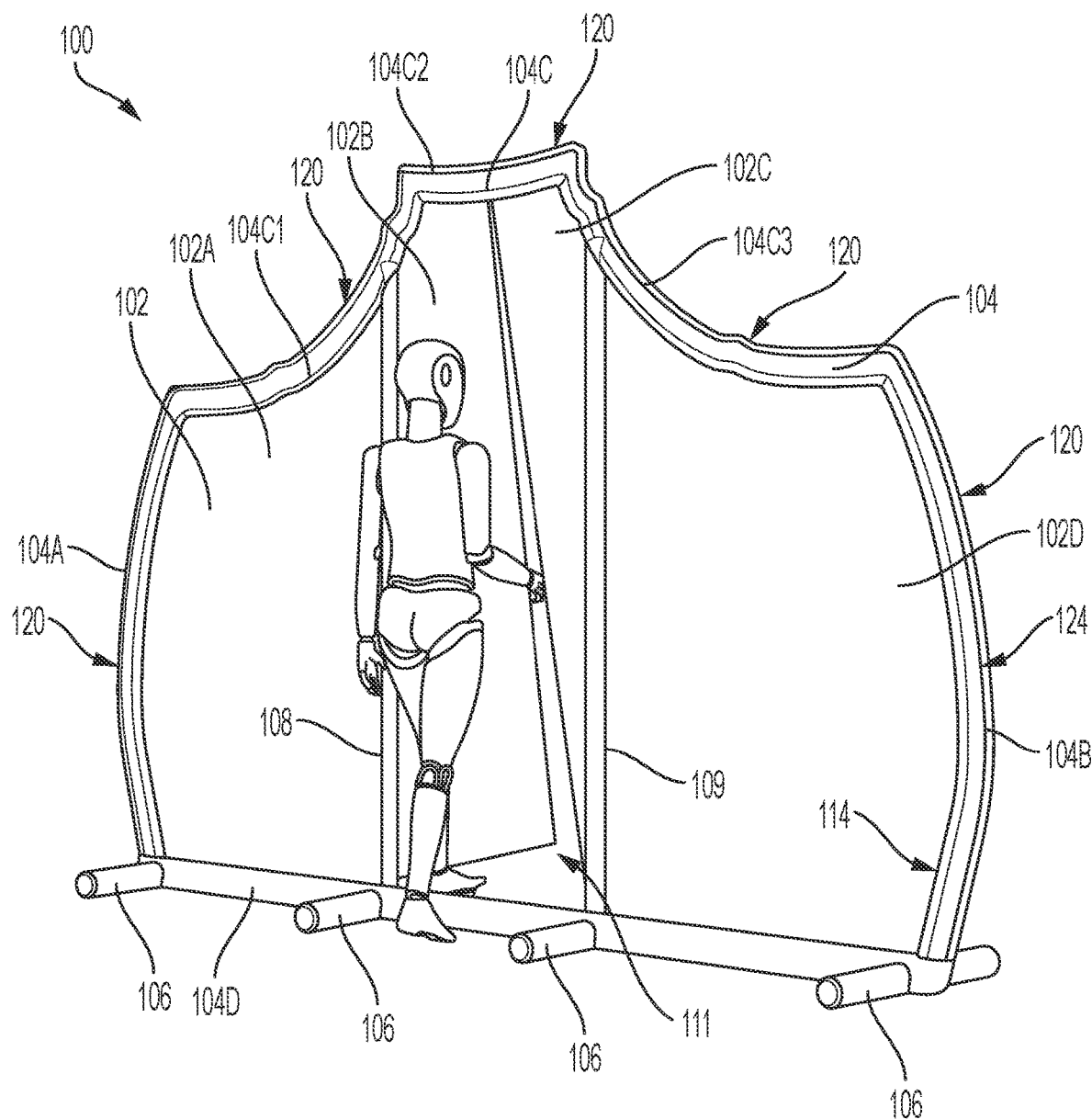
FIG. 2 is a schematic front perspective view illustration of the inflatable partition shown in FIG. 1, illustrating an opening in the flexible membrane, according to an embodiment.

FIGS. 1 and 2 illustrate one embodiment of an inflatable partition 100. The inflatable partition 100 is a flexible member that can be unfolded and inflated between a first, or uninflated, configuration, and a second, or inflated, configuration. The inflatable partition 100 includes a flexible membrane 102 and an inflatable frame 104 encircling at least a portion of the flexible membrane 102. In various embodiments, the flexible membrane 102 is a foldable, flexible material such as plastic, for example and without limitation, that can be manipulated by hand between the first configuration for storage and transport and unfolded and inflated to the second configuration, for use as a partition between adjoining areas. In some embodiments, the flexible membrane 102 is substantially rectangular. In various embodiments, the flexible membrane 102 is shaped to tightly fit against the interior walls or surfaces of a cabin, such as a cabin of an aircraft fuselage.

In some embodiments, the flexible membrane 102 includes multiple portions that are coupled together across the length and/or height of the inflatable partition 100 to form a continuous divider. As shown in FIG. 1, the flexible membrane 102 includes a first flexible membrane portion 102A, a second flexible membrane portion 102B, a third flexible membrane portion 102C, and a fourth flexible membrane portion 102D. However, in some embodiments, the first, second, third, and fourth flexible membrane portions 102A, 102B, 102C, and 102D are not distinct and separate portions but identify areas of the flexible membrane 102 that are separated by other components of the inflatable partition 100.

In various embodiments, the flexible membrane 102 is substantially transparent, that is, the flexible membrane 102 is see-through to allow an attendant, such as a flight attendant, to view the occupants of each area separated by the inflatable partition 100. In other embodiments, the flexible membrane 102 is opaque, colored, frosted, or includes a design, logo, or other representation.

In some embodiments, as shown in FIG. 1, the inflatable partition 100 includes a first tension member 108 and a second tension member 109. In the illustrated embodiment, the first and second tension members 108, 109 are substantially parallel and extend between the top and bottom edges of the flexible membrane 102 to provide additional stability to the flexible membrane 102 when the inflatable partition 100 is in the second, or inflated, configuration. In various embodiments, the first and second tension members 108, 109 are inflatable members. In various embodiments, the first and second tension members 108, 109 are flexible straps or rods that are more rigid than the flexible membrane 102. In various embodiments, the first and second tension members 108, 109 are inflatable. The first and second tension members 108, 109 define a doorway or opening 111 in the flexible membrane 102. The second and third flexible membrane portions 102B and 102C are releasably coupled by a coupling at a seam 110. The seam 110 joins a first edge of the second flexible membrane portion 102B with a second edge of the third flexible membrane portion 102C. In various embodiments, the coupling is a magnetic coupling. In various embodiments, the coupling is a reusable adhesive, hook and loop closure, or other type of mechanical closure or fastening, for example and without limitation.

The inflatable partition 100 also includes one or more support members 106 coupled to the inflatable frame 104. As shown in FIG. 2, the inflatable partition 100 includes four support members 106. In various embodiments, the support members 106 are inflatable members in fluidic communication with the bottom portion 104D of the inflatable frame 104. The support members 106 extend generally perpendicular to the inflatable frame 104 to support the inflatable frame 104 when the inflatable partition 100 is inflated and positioned in the desired location. In various embodiments, the inflatable partition 100 includes more or fewer support members 106, depending on various factors such as, for example and without limitation, the size of the inflatable partition 100, the position of the inflatable partition 100, etc.

The inflatable frame 104 extends along the outer edge of the flexible membrane 102. As shown in FIG. 1, the inflatable frame 104 is inflatable and deflatable between a first, or deflated, state and a second, or inflated, state. The inflatable frame 104 is inflatable via any means of inflation including, for example and without limitation, an inflation mechanism internal or external to the inflatable partition 100, such as a compressed air cartridge or cylinder, a handheld or electric pump, battery-powered compressor or fan, etc. In various embodiments, the inflatable frame 104 has a varying diameter around the periphery of the flexible membrane 102. The time to deploy or inflate the inflatable partition 100 and the overall weight of the inflatable partition 100 is reduced when the diameter of the inflatable frame 104 is progressively reduced from the bottom to the top of the inflatable partition 100. In other words, the diameter of the inflatable frame 104 is larger at the bottom of the inflatable partition 100 than at the top. In addition, the varying diameter of the inflatable frame 104 results in a lower center of gravity of the inflatable partition 100 for better stability when the inflatable partition 100 is inflated and positioned at the desired location.

With continued reference to FIGS. 1 and 2, the inflatable frame 104 includes an inner edge 114 adjacent to the flexible membrane 102 and an outer edge 124. In various embodiments, the inflatable frame 104 includes a first side 104A, a second side 104B opposite the first side 104A, an upper portion 104C connecting the first and second sides 104A, 104B, and a bottom portion 104D opposite the upper portion 104C. In various embodiments, the upper portion 104C is shaped with one or more distinct portions arranged in series, such as a first upper portion 104C1, a second upper portion 104C2, and a third upper portion 104C3. The first side 104A, the second side 104B, and the upper portion 104C are shaped to align with, and seal against the ceiling, surface, and/or walls of the intended location of use of the inflatable partition 100, as discussed in greater detail herein.

Figure 3:
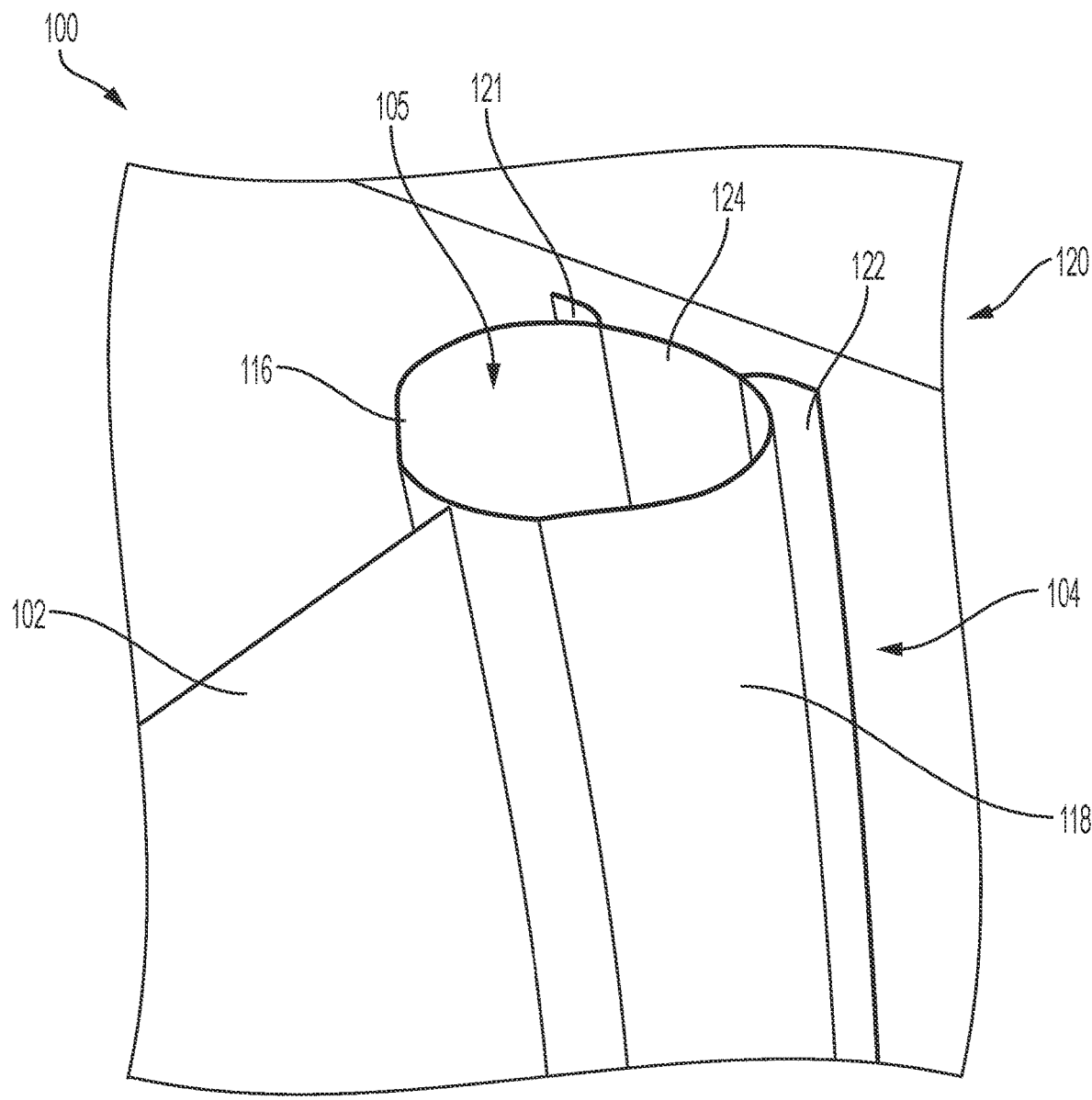
FIG. 3 is a schematic partial perspective view illustration of the inflatable frame of the inflatable partition shown in FIG. 1, according to an embodiment.
Figure 4:
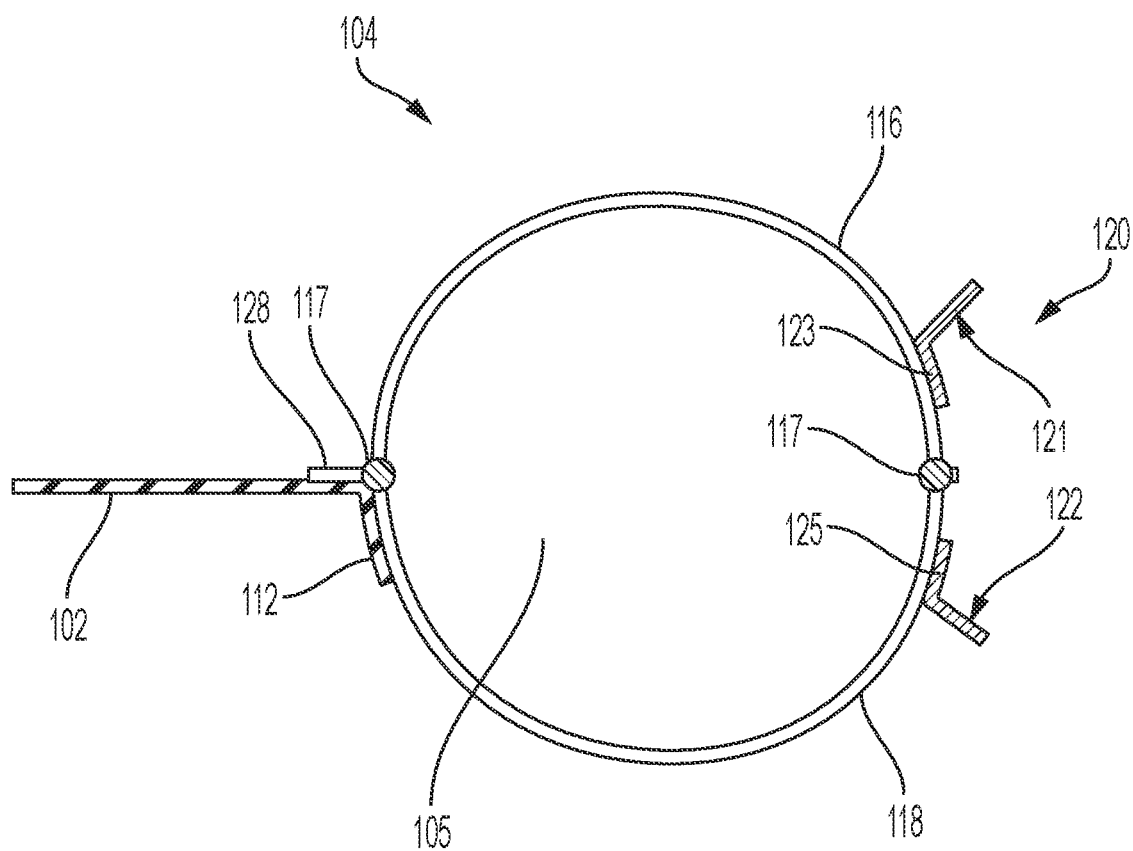
FIG. 4 is a schematic top cutaway partial view illustration of the inflatable frame of the inflatable partition, according to an embodiment.

In various embodiments, as shown in FIG. 1 and in greater detail in FIGS. 3 and 4, the inflatable frame 104 further includes a sealing mechanism 120. The sealing mechanism 120 extends along at least a portion of the outer edge 124 of the inflatable frame 104. In various embodiments, a sealing mechanism 120 extends along each of the first and second sides 104A, 104B of the inflatable frame 104. In various embodiments, a sealing mechanism 120 extends along the upper portion 104C of the inflatable frame 104, including one or more of the first, second, and third upper portions 104C1, 104C2, 104C3. In various embodiments, the sealing mechanism 120 is segmented; that is, separate and discrete sealing mechanisms 120 extend along at least a portion of the outer edge 124 of the inflatable frame 104. In other words, the sealing mechanism 120 is continuous along at least a portion of the outer edge 124 of the inflatable frame 104 in some embodiments, while in some embodiments, the sealing mechanism 120 includes a plurality of sealing mechanisms 120 extending along at least a portion of the outer edge 124 of the inflatable frame 104. In various embodiments, the plurality of sealing mechanisms 120 are separated by dividers, such as silicon rubber dividers, to allow local generation of negative pressure in each sealing mechanism segment 120, as discussed in greater detail herein.

With continued reference to FIGS. 3 and 4, in various embodiments, the inflatable frame 104 includes a first inflatable frame member 116 and a second inflatable frame member 118. The first and second inflatable frame members 116, 118 are joined together at joints 117 to define an inflatable area 105 of the tubular structure of the inflatable frame 104. In various embodiments, at least a portion of each of the first and second inflatable frame members 116, 118 overlap at the joints 117. In some embodiments, the first and second inflatable frame members 116, 118 are coupled together with adhesive, for example and without limitation. In various embodiments, the flexible membrane 102 includes a joining tab 112. The joining tab 112 is coupled to the inflatable frame 104 using any coupling means, such as adhesive, for example and without limitation. In various embodiments, at least a portion 128 of the second inflatable frame member 118 overlaps and is coupled to the edge of the flexible membrane 102 to provide additional support for the coupling between the flexible membrane 102 and the inflatable frame 104.

The sealing mechanism 120 includes a first sealing member 121 and a second sealing member 122 spaced apart from the first sealing member 121. In various embodiments, the first and second sealing members 121, 122 are flexible strips extending outward from the outer edge 124 of the inflatable frame 104. Each of the first and second sealing members 121, 122 is configured to frictionally engage with a surface such that the inflatable partition 100 is releasably secured to the surface. At least a portion of the first sealing member 121 is coupled to the inflatable frame 104. Similarly, at least a portion of the second sealing member 122 is coupled to the inflatable frame 104. As shown in FIG. 4, a first sealing member tab 123 is coupled to the first inflatable frame member 116 using any coupling means, such as adhesive, for example and without limitation. The second sealing member tab 125 is coupled to the second inflatable frame member 118 using adhesive, or any other coupling means. As discussed in greater detail herein, the first and second sealing members 121, 122, along with the tubular structure of the inflatable frame 104, create a negative pressure zone between the inflatable frame 104 and the surface against which the inflatable partition 100 is positioned. The first and second sealing members 121, 122 further provide an increased contact area with the surface against which the inflatable partition 100 is positioned to frictionally engage with the surface and support the inflatable partition 100 in the desired location.

Figure 5:
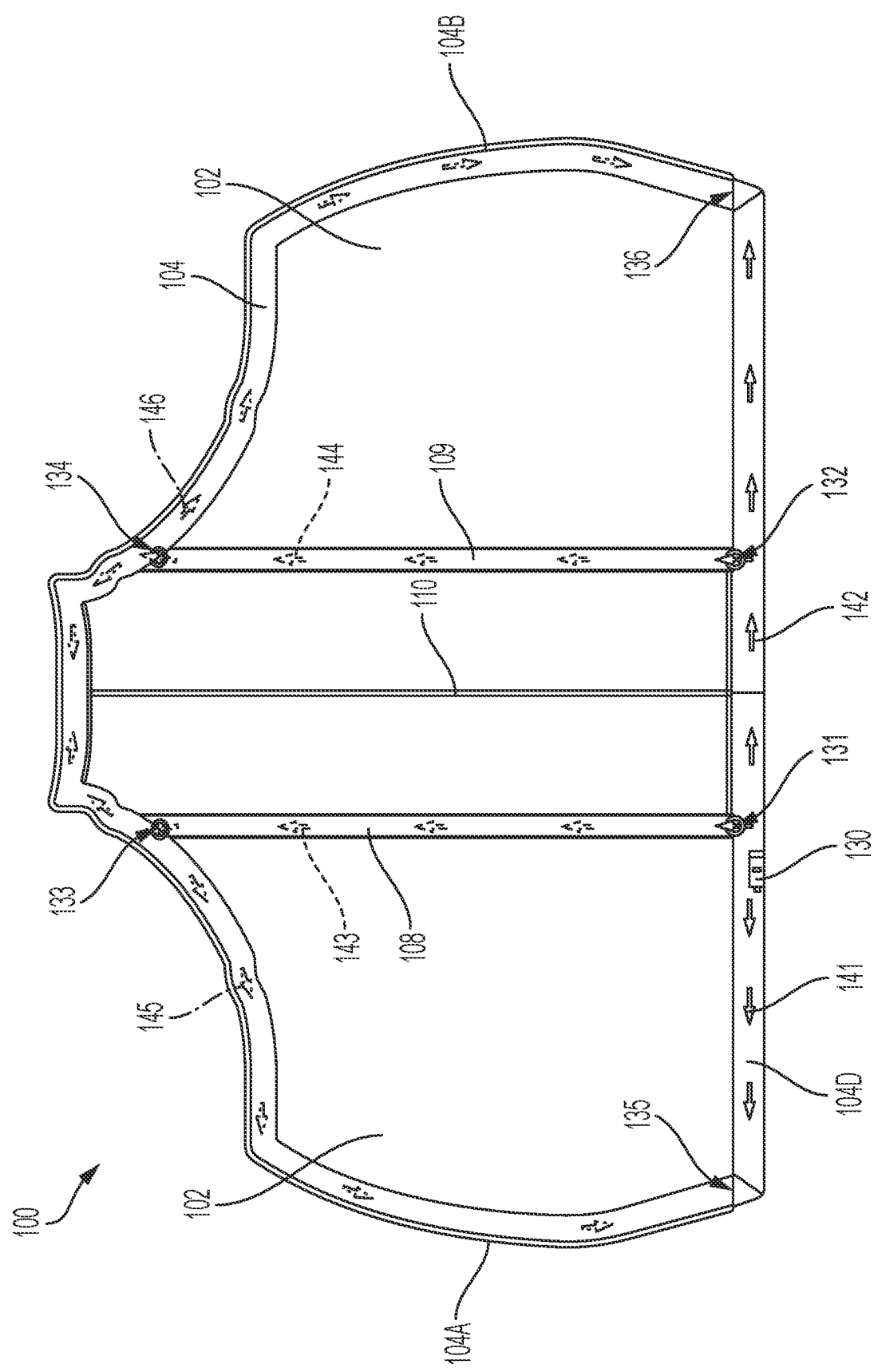
FIG. 5 is a schematic front view illustration of the inflatable partition shown in FIG. 1, illustrating inflation air flow within the inflatable frame, according to an embodiment.

As shown in FIG. 5, an inflation mechanism 130 is coupled with the inflatable partition 100 and is controlled by the operator to inflate and/or deflate the inflatable partition 100. In various embodiments, the inflation mechanism 130 includes a one-way valve. In various embodiments, the inflation mechanism 130 is a pump, compressed air cartridge or cylinder, or fan, for example and without limitation. In various embodiments, the inflation mechanism 130 includes a battery, a motor coupled to the battery, and a turbine coupled to the motor, all contained within the inflation mechanism 130 coupled to the inflatable frame 104. In various embodiments, the inflation mechanism 130 is incorporated into or coupled with the bottom portion 104D of the inflatable frame 104. While the inflation mechanism 130 is shown in one location on the inflatable partition 100, it is understood that the inflation mechanism 130 may be located anywhere within or coupled to the inflatable partition 100.

FIG. 5 illustrates a flow of air through the tubular structure of the inflatable frame 104, according to an embodiment. In the illustrated embodiment, the first and second tension members 108, 109 are inflatable members that are coupled with the inflatable frame 104 using one-way valves 131, 132, 133, 134. The one-way valves 131, 132, 133, 134 permit a flow of air from the inflation mechanism 130 through the first and second tension members 108, 109 and into the tubular structure of the inflatable frame 104.

In the illustrated embodiment, the inflation mechanism 130 generates a flow of air 141 that progresses to the left (shown by the arrows 141) and a flow of air 142 that progresses to the right (shown by the arrows 142) through the bottom portion 104D of the inflatable frame 104. The first side 104A of the inflatable frame 104 is coupled with the bottom portion 104D at a first sealed junction 135. Similarly, the second side 104B of the inflatable frame 104 is coupled with the bottom portion 104D at a second sealed junction 136. Air flows from the bottom portion 104D upward through the first and second tension members 108, 109 via the one way valves 131, 132, as shown by the arrows 143, 144, when a predetermined pressure within the bottom portion 104D is reached. As a result, the first and second tension members 108, 109 are inflated at approximately the same rate to raise the flexible membrane 102 coupled to the first and second tension members 108, 109.

The one-way valves 133, 134 open when a predetermined pressure is reached within the first and second tension members 108, 109. Air then enters the upper portion 104C of the inflatable frame 104 via the one-way valves 133, 134. The air is distributed throughout the first side 104A, the second side 104B, and the upper portion 104C of the inflatable frame 104, as illustrated by the arrows 145, 146. FIG. 5 illustrates one embodiment of the inflatable partition 100 including a plurality of one way valves to direct the air through the inflatable frame 104; however, it is understood that other configurations of one way valves, including more or fewer valves and different placement of the valves, and connections between the tubular members of the inflatable frame 104 are possible.

In various embodiments, at least a portion of the inflatable frame 104 of the inflatable partition 100 includes a compressible material capable of at least partially self-inflating the inflatable frame 104 when in fluidic communication with ambient air.

Figure 6:
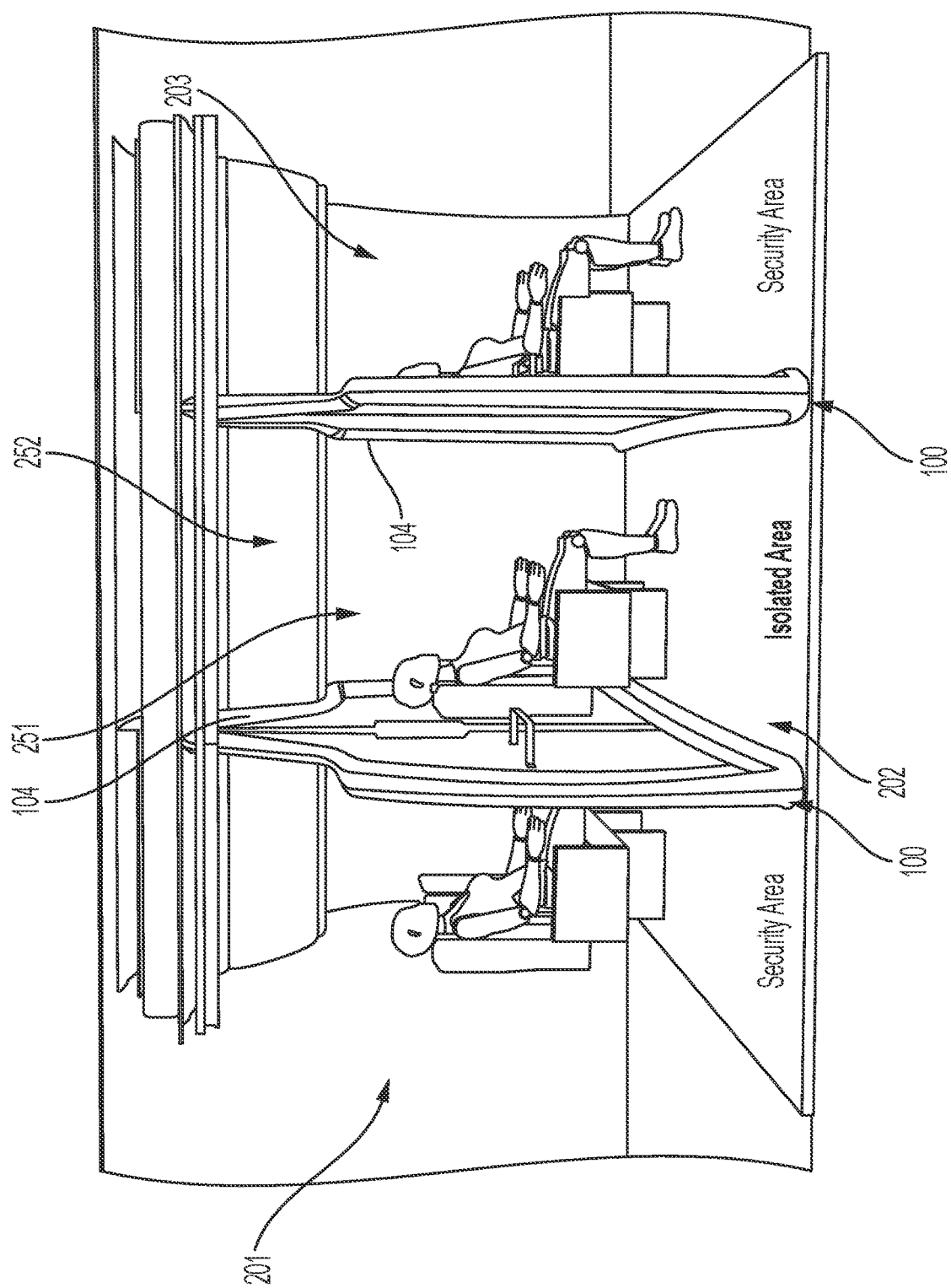
FIG. 6 is a schematic cutaway view of two inflatable partitions installed in a cabin area as a temporary, physical barrier between adjacent rows of seats, according to an embodiment.

FIG. 6 illustrates two inflatable partitions 100 positioned within a vehicle, such as an aircraft cabin, to create a barrier between adjacent areas, such as adjacent rows of seats. The inflatable partitions 100 are shown in the second, or unfolded and/or inflated, configuration. One of the inflatable partitions 100 separates a first area 201 from a second area 202. The other inflatable partition 100 separates the second area 202 from a third area 203. The second area 202 is, in some embodiments, a defined isolated area from the rest of the aircraft cabin.

As shown in FIG. 6, the inflatable frame 104 is positioned adjacent to the surfaces 251, 252 of the aircraft cabin interior. The inflatable partition 100 has a slightly smaller dimension than the cabin interior such that the first and second sealing members 121, 122 of the sealing mechanism 120 will close any gap between the inflatable frame 104 and the surfaces 251, 252. When the inflatable partition 100 is in the second, or inflated, configuration, the inflatable frame 104 is enlarged due to the pressure in the tubular structure. Air within the gap between the first and second sealing members 121, 122 and the surface 251 will be squeezed out due to the pressure of the tubular structure of the inflatable frame 104 against the surface 251, thus creating a negative pressure zone between the sealing mechanism 120 and the surface 251. The first and second sealing members 121, 122 frictionally engage with the surface 251 to help secure the inflatable partition 100 in the desired position and to seal the inflatable partition against the surface 251. Furthermore, the magnetic or other coupling of the flexible membrane 102 at the seam 110 provides additional sealing benefits while allowing ingress to and egress from the area 202.

Figure 7:
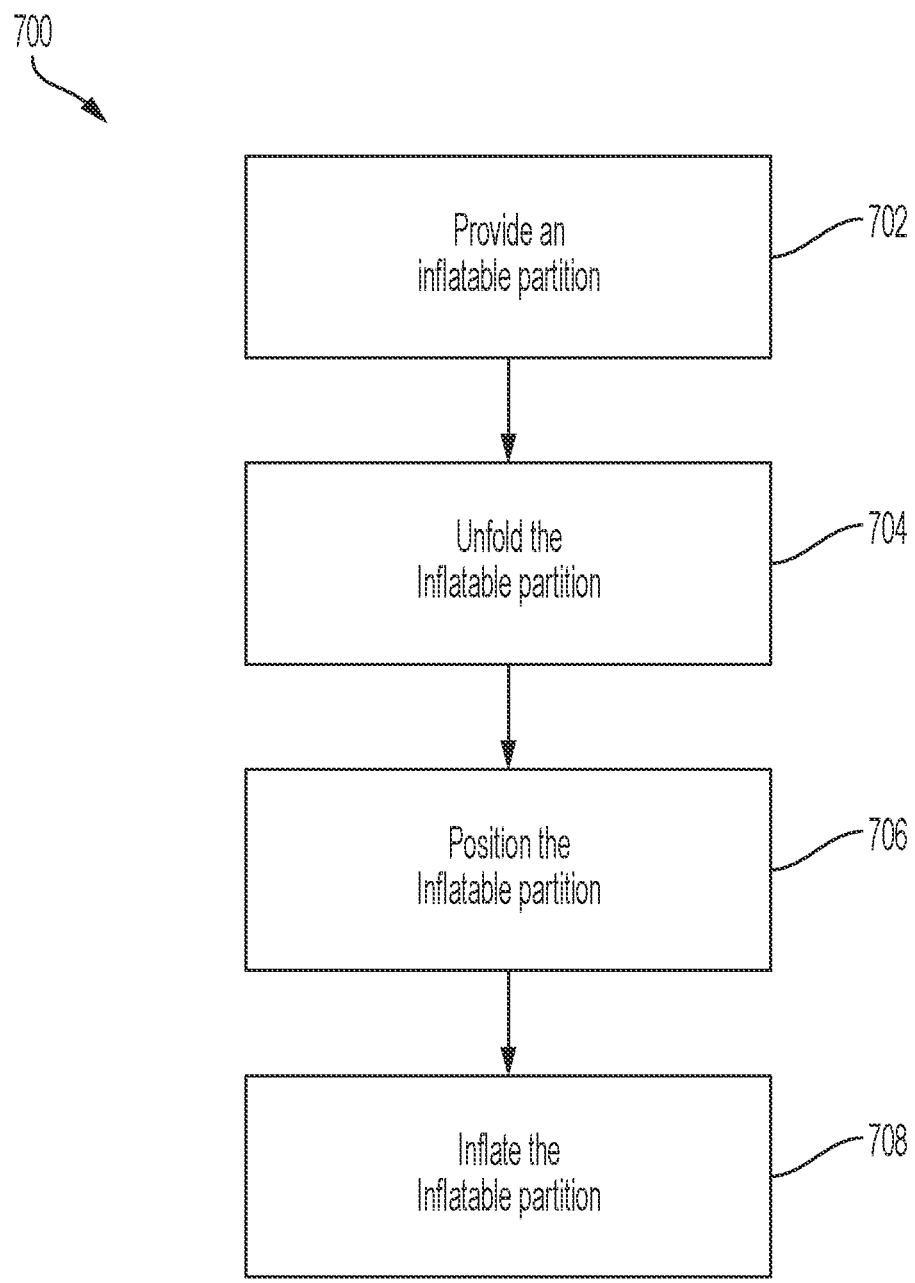
FIG. 7 is a flowchart illustration of a method for establishing a temporary barrier, according to an embodiment.

A method 700 to provide an inflatable partition as a temporary, physical barrier is illustrated as a flowchart in FIG. 7. The method 700 can be utilized in connection with the inflatable partition 100 discussed herein. The order of operation of the method 700 is not limited to the sequential execution as illustrated in FIG. 7, but may be performed in one or more varying orders, or steps may be performed simultaneously, as applicable in accordance with the present disclosure.

Beginning at 702, an inflatable partition, such as the inflatable partition 100, is provided. Next, at 704, the inflatable partition 100 is unfolded from the first, or folded and uninflated, configuration, to the second, or unfolded, configuration.

The method 700 continues at 706, wherein the inflatable frame 104 of the inflatable partition 100 is positioned at a desired location of the temporary barrier. In various embodiments, the desired location is a position between adjacent rows of seats, such as seats on an aircraft, bus, train, car, truck, or other vehicle, as shown in FIG. 6.

Next, at 708, the inflatable partition 100 is inflated by the inflation mechanism 130. Air or other fluid can be used to inflate the inflatable frame 104 as discussed herein. Furthermore, as discussed herein, any of a number of inflation mechanisms may be used to inflate the inflatable frame 104.

As discussed herein, inflation of the inflatable partition 100 temporarily secures the inflatable frame 104 against the surface at the desired location using a combination of frictional engagement and negative pressure. In various embodiments, other means of securing the inflatable partition 100 at the desired location are used including, for example and without limitation, temporarily securing one or more of the support members 106 to the lower surface or floor at the desired location.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed:

1. A method of manufacturing an inflatable partition for a vehicle, the vehicle having a vehicle body with an interior surface, the method comprising:
    forming a flexible membrane configured to be disposed within the vehicle body;
    attaching an inflatable frame to an outer periphery of the flexible membrane, the inflatable frame having an inner edge adjacent the flexible membrane, an outer edge opposite the inner edge, a first side, a second side opposite the first side, an upper portion connected to the first and/or second sides, and a bottom portion opposite the upper portion, the inflatable frame being inflatable between a first state and a second state;
    attaching a sealing mechanism to the outer edge of the inflatable frame, the sealing mechanism being configured to press against and attach to the interior surface of the vehicle body, the sealing mechanism including a first flexible flap projecting in a first direction from a front side of the inflatable frame and a second flexible flap projecting in a second direction, distinct from the first direction, from a back side of the inflatable frame; and
    attaching first and second structural members to the inflatable frame such that the first and second structural members extend between the upper portion and the bottom portion, the first and second structural members defining an opening in the inflatable partition.

2. The method of claim 1, wherein the sealing mechanism includes a first sealing mechanism section extending along the first side of the inflatable frame and a second sealing mechanism section extending along the second side of the inflatable frame.

3. The method of claim 2, wherein the sealing mechanism further includes a third sealing mechanism section extending along the upper portion of the inflatable frame and connected to the first and second sealing mechanism sections.

4. The method of claim 1, wherein the first flexible flap is spaced apart from the second flexible flap.

5. The method of claim 1, wherein the first and second flexible flaps are configured to frictionally engage with the interior surface to thereby releasably secure the inflatable partition to the vehicle body when the inflatable frame is inflated to the second state.

6. The method of claim 1, further comprising forming the first and second flexible flaps with a silicone rubber.

7. The method of claim 1, wherein the first flexible flap is spaced apart from the second flexible flap, and wherein the first and second flexible flaps are configured to frictionally engage with the interior surface when the inflatable frame is inflated to the second state and thereby create a negative pressure condition in which a first air pressure inside a zone between the inflatable frame and the interior surface is less than a second air pressure inside the vehicle body.

8. The method of claim 1, wherein the flexible membrane includes a first membrane section extending from the inner edge of the first side of the inflatable frame to the first structural member, a second membrane section extending from the first structural member, a third membrane section extending from the second structural member, and a fourth membrane section extending from the inner edge of the second side of the inflatable frame to the second structural member.

9. The method of claim 1, wherein the first state is an uninflated state and the second state is an inflated state.

10. The method of claim 1, further comprising attaching a support member to the inflatable frame, the support member being inflatable and fluidly coupled to the inflatable frame.

11. The method of claim 10, wherein the support member includes a first inflatable support leg spaced from a second inflatable support leg, wherein each of the first and second inflatable support legs projects perpendicular from the bottom portion of the inflatable frame.

12. The method of claim 11, wherein each of the first and second inflatable support legs includes a plurality of inflatable support legs fluidly coupled to the inflatable frame and projecting from opposing front and back sides of the bottom portion of the inflatable frame.

13. The method of claim 1, wherein the inflatable frame has a first portion with a first width and a second portion with a second width, smaller than the first width, when the inflatable frame is inflated to the second state.

14. The method of claim 1, further comprising attaching an inflation mechanism to the inflatable frame, the inflation mechanism including a battery, a motor coupled to the battery, and a turbine coupled to the motor and fluidly connected to the inflatable frame, wherein the inflation mechanism is configured to inflate the inflatable frame.

15. A method of installing an inflatable partition into a vehicle, the vehicle having a vehicle body with an interior surface, the method comprising:

disposing the inflatable partition inside the vehicle body, the inflatable partition including:
a flexible membrane;
an inflatable frame attached to an outer periphery of the flexible membrane, the inflatable frame having an inner edge adjacent to the flexible membrane, an outer edge opposite the inner edge, a first side, a second side opposite the first side, an upper portion connected to the first and second sides, and a bottom portion opposite the upper portion and connected to the first and second sides;
a sealing mechanism extending along at least a portion of the outer edge of the inflatable frame, the sealing mechanism including a first flexible flap projecting in a first direction from a front side of the inflatable frame and a second flexible flap projecting in a second direction, distinct from the first direction, from a back side of the inflatable frame; and
first and second structural members attached to the inflatable frame and extending between the upper portion and the bottom portion of the inflatable frame, the first and second structural members defining an opening in the inflatable partition; and
inflating the inflatable frame from a first state to a second state such that the sealing mechanism presses against and thereby attaches to the interior surface of the vehicle body.

16. The method of claim 15, wherein the sealing mechanism includes a first sealing mechanism section extending along the first side of the inflatable frame and a second sealing mechanism section extending along the second side of the inflatable frame.

17. The method of claim 16, wherein the sealing mechanism further includes a third sealing mechanism section extending along the upper portion of the inflatable frame and connected to the first and second sealing mechanism sections.

18. The method of claim 15, wherein the first flexible flap is spaced apart from the second flexible flap, and wherein the first and second flexible flaps are configured to frictionally engage with the interior surface when the inflatable frame is inflated to the second state and thereby create a negative pressure condition in which a first air pressure inside a zone between the inflatable frame and the interior surface is less than a second air pressure inside the vehicle body.

19. The method of claim 15, further comprising attaching an inflatable support member to the inflatable frame, the support member being fluidly coupled to and inflatable with the inflatable frame.

20. The method of claim 19, wherein the support member includes a first inflatable support leg spaced from a second inflatable support leg, wherein each of the first and second inflatable support legs projects perpendicular from the bottom portion of the inflatable frame.

* * * * *